United States Patent Office 3,152,927
Patented Oct. 13, 1964

3,152,927
METHOD FOR APPLYING GREEN PATINA TO OBJECTS, PREFERABLY MADE FROM COPPER OR COPPER ALLOYS
Malte Kurt Einar Mattsson and Rolf Oscar Holm, Vasteras, Sweden, assignors to Aktiebolaget Svenska Metallverken, Vasteras, Sweden, a joint-stock company limited of Sweden
No Drawing. Filed Feb. 9, 1961, Ser. No. 88,005
Claims priority, application Sweden, Feb. 11, 1960, 1,384/60
12 Claims. (Cl. 148—6.14)

The present invention relates to a method for applying to a surface, preferably of copper alloys, a green oxide coating with properties essentially identical with those found in natural patina formed on the surface of copper during years of exposure to open air.

The following requirements may be demanded of such a method:

That the patina acquire a natural look, that the patina be well preserved under prolonged exposure to open air, That the color of the patina develops rapidly, that the patina should not cause stress corrosion, That the method be simple, That the method be applicable, regardless of the size, shape or inclination of the surface to which the patina is to be applied, That the results shall be unaffected by atmospheric conditions prevailing during the application of the patina.

Numerous methods for the application of patina to surfaces of copper and copper alloys have been suggested in the past. None of these known methods, however, satisfies all the requirements listed above. In their publication "Economy Copper Roofing" (Publication No. 53, published 1957, the Copper Development Association points out, for example, that these known methods do not give a secure and fully satisfactory result where copper roofing is concerned, since the patina has a low adhesion and will peel off after the passage of time. Deutsches Kupfer Institut (The German Copper Institute) furthermore criticizes in their publication "Chemische Färbung von Kupfer und Kupferlegierungen" (chemical coloring of copper and copper alloys) (Folge II, published 1955) that the technical side of the application of green patina leaves much to be desired. In this connection some known methods prescribe the use of mixtures containing ammonia in the patina medium, and this creates a risk of stress corrosion in certain copper alloys.

According to the invention, there is provided a method which satisfies all the above requirements and which is characterized by the fact that an aqueous sludge containing basic copper salts, preferably together with copper hydroxide and possibly a thickening agent, is applied to the object, which is preferably made from copper or copper alloys. The preparation of the patination agent can be effected with simple equipment and practically in whatever locality available. The sludge can be applied to the surface to be treated like ordinary paint, independent of the inclination and shape of the surface. The method effects a coating of a patina which normally does not require any further treatment and which, directly after application, imparts to the surface a green color. In the case of humid and/or cold weather, however, the drying of the sludge has to be accelerated, if necessary with hot air. As has been observed the adherence of the patina to the surface will be most effective if the sludge is dried immediately after application. After a short time the patina looks natural and exhibits high resistance to atmospheric conditions even including strains such as torrential rains and frost.

The process of rapid application of patina requires in principle a bonding of basic copper salts, belonging to the same group as the copper salts of natural patina to a surface. In order that the bonding to the surface shall be the best possible, a very important requirement has to be met, namely, that the basic copper salt has to have a copper hydroxide content in excess of the amount corresponding to the normal basic copper salt.

The composition of normal basic copper salts can generally be expressed by the following formula:

$$CuX_{2/z} \cdot 3Cu(OH)_2 \cdot nH_2O$$

where X represents the anion of the salt, $z$ its valency and $n$ the contents of crystal water. The basic salt can be produced by adding an alkaline agent (alkali) to a solution of the copper salt in question. The inventors consider alkali metal hydroxides to be preferred as precipitants to alkali metal carbonates and bicarbonates as well as alkaline earth hydroxides. On precipitation with an alkali carbonate or bicarbonate, the basic copper salt is mixed with the basic copper carbonate and on precipitation with an alkaline earth hydroxide, the precipitate is largely contaminated by alkaline earth salts. These contaminants have an unfavorable influence on the adhesion of the patina. In complete reaction with alkali to the basic copper salt, which can be brought about under optimal conditions, 1.5 mols of alkali hydroxide per mol copper salt is consumed for precipitation. If the alkali is added in excess, part of the basic copper salt formed will be converted to copper hydroxide and at a certain excess of alkali depending on the precipitation conditions the precipitated sludge attains a composition favorable for artifical patination. If alkali is added in too large an excess the color fastness of the patina sludge is affected, so that the sludge darkens relatively rapidly through successive decomposition to dark copper oxide and water.

As mentioned above, the copper hydroxide content of the precipitate is likewise dependent on other precipitation conditions. The concentrations of the copper and alkali solutions and the method of adding alkali and the precipitation temperature are of great importance. Thus, too high a concentration of the copper salt and alkali and too high a temperature result in an excessive content of copper hydroxide in the precipitate and, consequently, a sludge which tends to darken.

Remaining residues of mother liquor also have a tendency to cause a dark coloration of the sludge. This is possibly due to the fact that alkali, which has a tendency to be absorbed by the sludge, gradually reacts with basic copper salts under the formation of copper oxide and alkali sulphate. This impurity in the sludge has been known to cause decreased adhesion. To avoid this the sludge is washed with clean water after separation from the mother liquor.

The absorption of alkali by the sludge can be avoided by the addition of a saccharide, preferably sucrose, to the copper solution. When adding saccharides there is no reason to wash the sludge after separation. The presence of saccharide in the precipitation of the sludge has also shown the effect of giving more finely distributed particles in the precipitate which, to a certain extent, improves the covering power of the sludge. When using patina sludge the yield, however, is somewhat lower when adding saccharide since the saccharides slowly dissolve and reduce copper compounds in an alkaline medium.

Natural patina usually has a yellow green tinge, caused by the presence of iron compounds in the patina. In order to match this tinge as closely as possible when using the present method of artificial patination, an admixture of iron salts to the copper solution, out of which the patina sludge shall be precipitated, has appeared to be suitable.

The method for artificial patination according to this new method, has shown a particularly good result with a sludge composed mainly of basic copper nitrate. One of the reasons for this is that the basic copper nitrate has a flake-like crystal structure which covers the surface with a very dense coating in the patination process. Another reason seems to reside in the fact that in contrast with most of the other basic copper salts the crystal structure of the basic copper nitrate permits a transformation between basic salt and copper hydroxide without any change of the structure. The above mentioned circumstances point to the fact that patina based on copper nitrate can resist the destructive influence of atmospheric conditions also during the first period of exposure which, as a rule, is critical for artificial patina.

In exposure experiments the inventors have found that artificial patina shows specially good adhesion to such metal surfaces which are covered with an adhering oxide layer, the thickness of which is sufficient to give the metal surface a dark color.

The effect of such an oxide layer is of special importance if the surface has been contaminated prior to the patination, for example, by fingerprints caused by handling. An oxide layer of the kind contemplated is formed slowly when the metal is subjected to outdoor exposure. It can, however, be rapidly developed either by annealing in an oxygen atmosphere or by other chemical or electrochemical methods. The inventors, in the light of what has been said above, recommend for construction elements like roofing and facades, that objects made from copper or copper alloys be provided on their surface with an adherent layer of oxide and, after mounting, applying the patination agent. Thus, a material may be chosen which has been allowed to keep the oxide layer formed through annealing or hot rolling during the manufacturing process. According to the invention it has been observed that the oxide layer should suitably have a thickness within the range of $0.1-50\mu$, preferably $0.5-10\mu$.

Although the invention has been described here in connection with the patination of objects made from copper or copper alloys, and this is the most important embodiment, it is not limited to these materials only, but it is possible to choose as a base material also other metals as well, as non-metallic materials as for example glass, pasteboard, wood, plastic and concrete.

An object of the present invention is to provide an agent for green patination of objects, which are preferably made from copper or copper alloys, said agent according to the invention, comprising an aqueous sludge, the main ingredients of which are basic copper salts, preferably together with copper hydroxide. The basic copper salts preferably include basic copper nitrate. Furthermore, a minor addition of iron compounds adapted to give the patina the true natural yellow green color may be added.

The composition of the patination agent can best be defined by the method for its production. Thus, a patination agent according to the invention consists of an aqueous product obtained by mixing an aqueous solution of 20–200 grams per liter, preferably 100 grams per liter, of copper (II) nitrate calculated as $Cu(NO_3)_2$, and up to 100 grams per liter, preferably 10 grams per liter, of iron (III) sulphate, calculated as $Fe_2(SO_4)_3$, with an aqueous solution of 20–50 grams per liter, preferably 40 grams per liter, of sodium hydroxide, whereby the two solutions having been mixed in a proportion by volume corresponding to 1–3 mols, preferably 2–2.5 mols, NaOH per mol $Cu(NO_3)_2$.

This invention also relates to a method of producing an agent for artificial green patination of objects preferably made from copper or copper alloys, which is characterized by mixing an aqueous solution of a copper salt, preferably selected from a group comprising $CuCl_2$, $Cu(NO_3)_2$ and $CuSO_4$, with an aqueous solution and/or an aqueous suspension of an alkaline agent selected from a group consisting of hydroxides, carbonates and bicarbonates of alkali and alkaline earth metals and oxides of alkaline earth metals, preferably hydroxides such as sodium hydroxide.

In a preferred embodiment of the present invention the patination agent is prepared by mixing at room temperature, an aqueous solution containing 20–200 grams per liter, preferably 100 grams per liter, copper (II) nitrate, calculated as $Cu(NO_3)_2$, and up to 100 grams per liter, preferably 10 grams per liter, iron (III) sulphate, calculated as $Fe_2(SO_4)_3$, with an aqueous solution containing 20–50 grams per liter, preferably 40 grams per liter, sodium hydroxide, wherein the sodium hydroxide solution is added in a volumetric proportion corresponding to 1–3 mols, preferably 2–2.5 mols, NaOH per mol $Cu(NO_3)_2$. "Room temperature" is considered to vary between about 0° C. and about 30° C.

When producing this agent the alkali solution is preferably added to the copper salt solution. The rate of addition (i.e. the quantity per unit of time) is hereby of decisive importance as regards the suitability of the resulting precipitate for the patination treatment. Especially towards the end of the precipitation operation it is of importance that the alkali solution be added at a controlled rate. The optimum rate of addition depends, among other facts, upon the precipitation temperature and the excess of alkali used. It is suitable to choose for the entire precipitation procedure a constant rate of addition so calculated that the operation will be finished within a period of 5–30 minutes. According to the invention, it has been found that the sludge attains a composition suitable for patination if the rate of addition is so adapted that the precipitation operation requires a time of about 15 minutes at usual ambient temperatures (about 20° C.) and at an alkali addition corresponding to 2.0–2.5 mols NaOH per mol copper salt in the solution.

Immediately after completion of the precipitation operation the precipitate formed is separated from the mother liquor and washed with water, preferably three times, each time with an amount of about 10 liters water per liter precipitated sludge.

As has been mentioned above, the absorption of the alkali by the precipitated sludge can be avoided by adding to the copper solution to be precipitated a saccharide, preferably sucrose (cane sugar). An admixture of up to 30 grams per liter has shown effective results.

An embodiment of the invention shall be described in the following with an example relating to green patination of a copper roof.

As construction material for the roof, soft annealed copper with a well adherent oxide layer having a thickness of $0.5-10\mu$ is chosen.

The oxidized plate is mounted on the roof according to conventional methods, including bending, folding, etc. The mechanical treatment does not to any great extent affect the oxide layer of the plate.

After the mounting, a sludge, consisting mainly of basic copper nitrate and copper hydroxide, is applied with a brush or a paint roller. This sludge is produced as follows:

Firstly a copper solution and an alkali solution are prepared with tap water or rain water. The composition of the copper solution is:

| | Grams per liter |
|---|---|
| Crystallized copper (II) nitrate, technical purity | 125 |
| Crystallized iron (III) sulphate, technical purity | 15 |

The composition of the alkali solution is:

Sodium hydroxide, technical purity 40 grams per liter.

From the copper solution so prepared, a sludge is precipitated at room temperature (about 20° C.) by adding alkali under constant stirring.

A total of 1.3 liter alkali solution is added per liter copper solution. The alkali solution is added at a constant rate and with such speed that the precipitation is finished within a time of about 15 minutes. Immediately after precipitation the precipitated sludge is separated from the mother liquor. If the procedure has been executed correctly, the solution will show, after separation an alkaline reaction which can best be indicated with a few drops of phenolphthalein solution which will turn the solution red. After separation from the mother liquor, the sludge is freed from residual alkali by washing three times, each time with 10 liters of water per liter of separated sludge.

The aqueous sludge will best be applied to the roof-plate under a period of warm and dry weather when drying is fast. If these conditions do not prevail, the treated plates should be dried with hot air. The application of the sludge can be repeated several times if a thick patina coating is desired each layer being allowed to dry before applying another.

Immediately after application of the patina, the green coat exhibits an excellent adhesion and excellent weather resistance and will, for example, withstand torrential rains without being washed away. After a few days the color will fully resemble that of a natural patina.

Having now described the invention, what we claim as new and desire to secure by Letters Patent is:

1. An agent for the artificial green patination of objects, comprising an aqueous sludge obtained by admixing to an aqueous solution containing 20 to 200 grams per liter copper (II) nitrate, calculated as $Cu(NO_3)_2$, and up to 100 grams per liter iron (III) sulfate, calculated as $Fe_2(SO_4)_3$, an aqueous solution containing 20 to 50 grams per liter of sodium hydroxide, wherein the two solutions have been mixed in a proportion corresponding to 1 to 3 mols NaOH per mol $Cu(NO_3)_2$.

2. An agent for the artificial green patination of objects, comprising an aqueous sludge obtained by admixing to an aqueous solution containing 100 grams per liter copper (II) nitrate, calculated as $Cu(NO_3)_2$, and 10 grams per liter iron (III) sulfate, calculated as $Fe_2(SO_4)_3$, an aqueous solution containing 40 grams per liter sodium hydroxide, wherein the solutions have been mixed in a proportion corresponding to 2 to 2.5 mols NaOH per mol $Cu(NO_3)_2$.

3. An agent for the artificial green patination of an object comprising an aqueous sludge of basic copper salt and copper hydroxide obtained by admixing to an aqueous solution containing 20 to 200 grams per liter copper (II) salt, an aqueous solution containing 20 to 50 grams per liter of an alkali metal hydroxide wherein the two solutions are mixed in a proportion corresponding to one to three mols of alkali metal hydroxide per mol of copper salt.

4. A method for the preparation of an agent for the green patination of objects, which comprises mixing an aqueous solution containing 20 to 200 grams per liter copper (II) nitrate, calculated as $Cu(NO_3)_2$, and up to 100 grams per liter iron (III) sulfate, calculated as $Fe_2(SO_4)_3$, with an aqueous solution containing 20 to 50 grams per liter sodium hydroxide to form a precipitate, the sodium hydroxide solution being added in a proportion corresponding to 1 to 3 mols NaOH per mol $Cu(NO_3)_2$, separating the thusly formed precipitate from the mother liquor and washing the precipitate with water.

5. A method according to claim 4, which comprises adding to the copper (II) nitrate solution a saccharide in an amount of up to 30 grams per liter.

6. A method according to claim 4, which comprises adding to the copper (II) nitrate solution sucrose in an amount of up to 30 grams per liter.

7. A method for the preparation of an agent for the green patination of objects which comprises mixing an aqueous solution containing 100 grams per liter copper (II) nitrate, calculated as $Cu(NO_3)_2$, and 10 grams per liter iron (III) sulfate, calculated as $Fe_2(SO_4)_3$, with an aqueous solution containing 40 grams per liter sodium hydroxide, the two solutions being mixed in a proportion corresponding to 2 to 2.5 mols NaOH per mol $Cu(NO_3)_2$, said solution forming a precipitate separating the thusly formed precipitate from the mother liquor and washing the precipitate with water.

8. A method for the artificial green patination of an untreated object which comprises preparing an aqueous sludge containing basic copper salts and copper hydroxide obtained by admixing to an aqueous solution of a copper salt selected from the group consisting of $CuCl_2$, $Cu(NO_3)_2$, and $CuSO_4$ an aqueous solution of an alkali metal hydroxide, wherein the two solutions have been mixed in a proportion corresponding to 1–3 mols of alkali metal hydroxide per mol of copper salt and applying the sludge directly onto the object to produce an artificial green patination thereon in the form of a substantially non-reacting coating on said object.

9. A method according to claim 8 wherein said object is made from copper and copper alloys and is subjected to an oxidation treatment sufficient to form on the surface thereof an adherent copper oxide layer having a thickness within the range of 0.1 to 50 microns, and subsequently said sludge is applied onto said object.

10. A method according to claim 8 wherein said object is made from copper and copper alloys and is subjected to an oxidation treatment sufficient to form on the surface thereof an adherent copper oxide layer having a thickness within the range of 0.5 to 10 microns, and subsequently said sludge is applied onto the object.

11. A method according to claim 8 which comprises drying the sludge after the application thereof onto said object with hot air.

12. A method for the artificial green patination of an untreated object which comprises preparing an aqueous sludge containing basic copper salts, copper hydroxide and iron compounds obtained by admixing to an aqueous solution of a copper salt selected from the group consisting of $CuCl_2$, $Cu(NO_3)_2$ and $CuSO_4$ and a soluble iron (III) salt, an aqueous solution of an alkali metal hydroxide, wherein the two solutions have been mixed in a proportion corresponding to 1–3 mols of alkali metal hydroxide per mol of copper salt, the iron (III) salt concentration being up to 0.2 mol per mol of copper salt and applying the sludge directly onto the object to produce an artificial green patination thereon in the form of a substantially non-reacting coating on said object.

References Cited in the file of this patent

UNITED STATES PATENTS

| | | |
|---|---|---|
| 1,428,170 | Laist et al. | Sept. 5, 1922 |
| 1,905,532 | Vannah | Apr. 25, 1933 |
| 1,937,524 | Marsh | Dec. 5, 1933 |
| 1,974,140 | Irion et al. | Sept. 18, 1934 |
| 2,064,301 | Freeman et al. | Dec. 15, 1936 |

OTHER REFERENCES

Harris: Metal Industry (London), vol. 78, Jan. 19, 1951, pages 43, 44, and 48.

Mellor's Modern Inorganic Chemistry, edited by Parkes, 1951, Longmans Green & Co., pages 615–622.